Patented Nov. 29, 1949

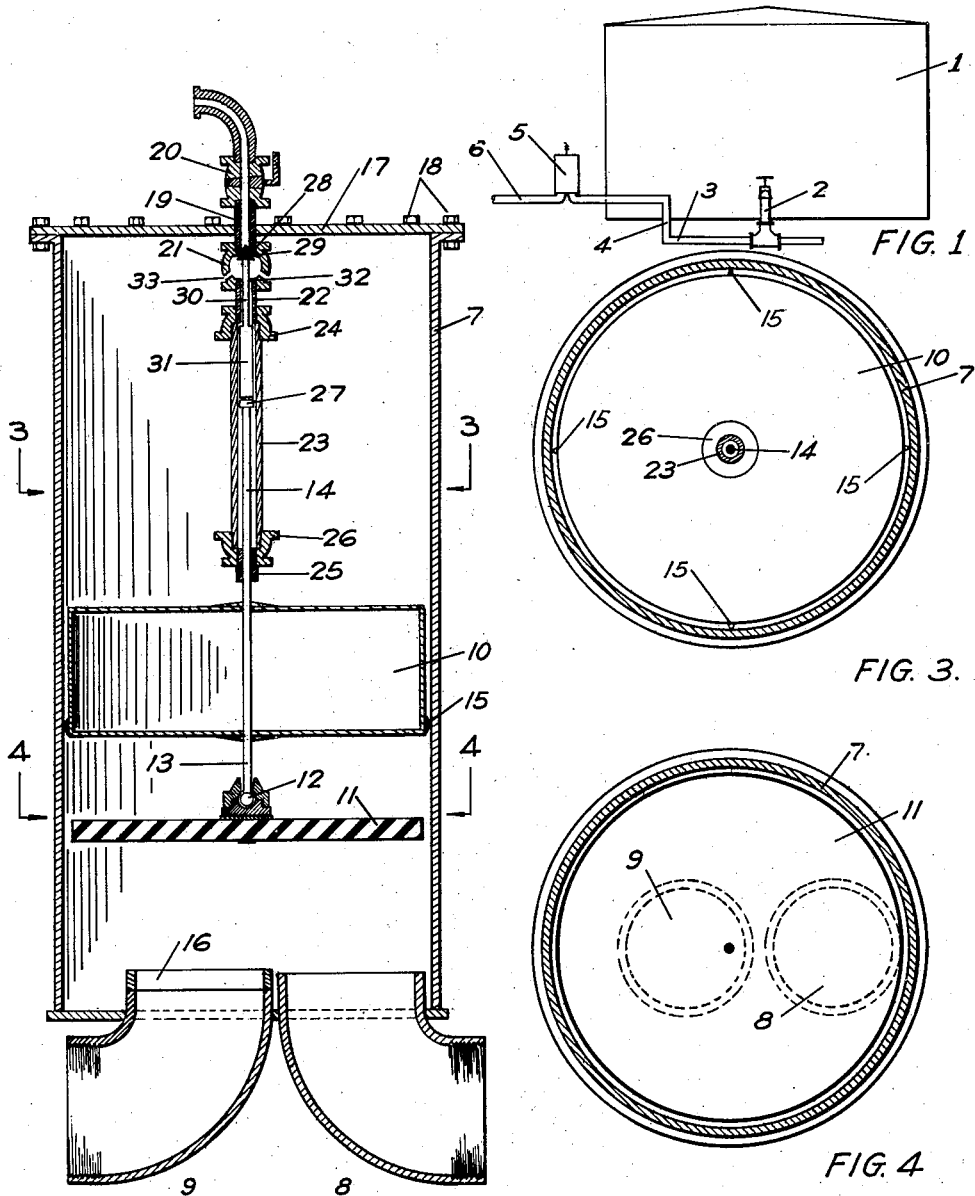

2,489,461

UNITED STATES PATENT OFFICE 2,489,461

AUTOMATIC SHUTOFF DEVICE

Tom E. Parrish, Beaumont, Tex.

Application October 2, 1948, Serial No. 52,549

1 Claim. (Cl. 137—68)

The invention concerns an automatic shutoff device for use in connection with a battery of one or more tanks such as those commonly used in oil pipe line gathering systems. It is common practice to pump oil from two or more of such tanks at the same time, the draw-off lines from the several tanks being served by a common pipe line. Ordinarily the liquid level in the several tanks of the battery becomes equalized during pumping. A pipe line may be fed by a number of such batteries of tanks, taking suction on all of them at the same time. The shutoff device of this invention may be used to shut off the flow of liquid from a given tank or battery when the liquid level therein has dropped below a certain point, such, for example, as the point where the draw-off line enters the tank. At the same time the connection between the draw-off line and the pipe line is positively closed so that no air is admitted to the pipe line from the tank.

A number of devices intended to be used for the purpose described are now on the market, and others are disclosed in previously issued patents, but none of them are entirely satisfactory.

In my copending application, Serial No. 714,819, filed December 7, 1946, I have disclosed and claimed an automatic shutoff device for liquid conducting lines. The automatic shutoff device described in this application is an improvement over the one disclosed in my copending application.

It is an object of the invention to provide an automatic shutoff device which is adapted to shut off the flow of liquid from a tank without permitting any air whatsoever to enter the pipe line from the tank. The presence of air in a pipe line destroys the suction and thus interferes with the pumping operation.

It is a further object of the invention to provide a float controlled shutoff valve which is fully automatic and is so designed that the float will rise and fall freely in response to fluctuations in liquid level and the valve will be properly seated.

The invention will be readily understood by referring to the following description and the accompanying drawing, in which:

Fig. 1 is a diagrammatic view in elevation showing one of a battery of tanks having its draw-off line connected to a header which may be connected also to other tanks of the battery (not shown), with the automatic shutoff device of the invention interposed between the header and the pipe line.

Fig. 2 is a sectional view in elevation of the shutoff device, showing the valve in open position.

Fig. 3 is a sectional view taken on the line 3—3 of Fig. 2.

Fig. 4 is a sectional view taken on the line 4—4 of Fig. 2.

Referring to the drawing, the numeral 1 indicates a tank which is connected thru valved draw-off line 2 to a header 3. The tank 1 is situated above the ground, while the header 3 is buried below the surface. A riser 4 connects the header 3 with the shutoff device of the invention, which is indicated generally by the numeral 5. The shutoff device 5 is connected by a discharge pipe 6 to a pipe line (not shown).

The shutoff device 5 comprises a vertically disposed cylindrical casing 7 which is of relatively large diameter and provides a float chamber of considerable cross sectional area. An inlet pipe 8 and an outlet pipe 9 enter the casing from the bottom and extend upwardly a short distance therefrom.

A cylindrical float 10 is received bodily within the casing 7. A valve disc 11 is connected at its center thru a ball joint 12 to the lower end of a valve stem 13 which extends upwardly thru the float 10. The float 10 is rigidly secured to the valve stem 13. The valve stem 13 extends upwardly above the float 10 and the upward extension thereof, indicated by the numeral 14, acts as a guide rod.

The diameter of the float 10 is only slightly less than the inside diameter of the casing 7. A plurality of resilient, spring-like guides 15 are attached to the lower end of the float 10 and extend outwardly therefrom to engage the inner wall of the casing 7.

The valve disc 11 preferably is made of a tough, resilient, rubber-like material such as neoprene, and is of relatively large diameter. It is adapted to cover the ends of both the inlet pipe 8 and the outlet pipe 9. The arrangement is such, however, that only the outlet pipe 9 is closed by operation of the valve disc 11. The upper end of the outlet pipe 9 is slightly higher than that of the inlet pipe 8 and terminates in a metal ring 16, which may be made of Monel or other suitable metal and which functions as a valve seat.

The top of the casing 7 is formed by a blind flange 17 which is secured to the upper end of the casing 7 by bolts 18. A vent pipe 19 extends thru the center of the flange 17 and is provided at its outer end with a stopcock 20. A valve housing 21 is connected at its upper end to the lower end of the vent pipe 19. A short nipple 22 is connected at its upper end to the lower end of the valve housing 21, and a sleeve-like member 23 is connected to the lower end of the nipple 22 by means of a reducer 24. A short nipple 25 is connected at its upper end to the lower end of the sleeve-like member 23 by means of a reducer 26.

The guide rod 14 extends upwardly thru the nipple 25, the reducer 26 and the sleeve-like member 23, and is provided at its upper end with an enlarged portion 27. The nipple 25 acts as a guide for the guide rod 14.

A valve seat 28 is provided in the valve housing 21, and a tapered valve 29 is secured to the upper end of a valve stem 30. The valve stem 30 extends downwardly thru the nipple 22 and is secured at its lower end to a cylindrical weight 31 which is received within the sleeve-like member 23. An annular member 32, which is positioned within the valve housing 21, limits the downward movement of the valve 29. The valve 29 preferably is made of a tough, resilient, rubber-like material such as neoprene, while the valve seat 28 may be made of brass. A plurality of orifices 33 are formed in the walls of the valve housing 21 below the valve seat 28 to permit the passage of air or other gas to or from the interior of the casing 7 thru the valve housing 21 and the vent pipe 19.

The shutoff device 5 may be installed with the bottom of the casing 7 at about the same elevation as the top of the draw-off connection 2. The elevation of the shutoff device 5 with reference to the tank 1 will determine the level obtaining in the tank 1 at the time the shutoff device 5 operates to stop the flow of liquid therefrom. The upper end of the outlet pipe 9 should be slightly higher than the draw-off connection 2 to prevent air or other gas from entering the casing 7 from the tank 1.

The operation of the automatic shutoff device of the invention is as follows:

With the tank 1 full of liquid and with the valved draw-off line 2 closed, and assuming that no liquid is flowing thru the header 3 from other tanks of the battery (not shown), the discharge pipe 6 will be disconnected from the shutoff device 5 by seating of the valve disc 11 on the valve seat 16 in the outlet pipe 9. Upon opening the valved draw-off line 2, liquid begins to flow thru the header 3 and the riser 4, and enters the casing 7 thru the inlet pipe 8. The valve disc 11 tends to remain seated due to the vacuum created by liquid moving thru the pipe line (not shown), but this tendency is at least partially overcome by the buoyancy of the float 10, which tends to lift the valve disc 11 from the valve seat 16. Moreover the liquid entering the casing 7 thru the inlet pipe 8 acts directly upon the under side of the valve disc 11, tending to lift it, and as the inlet pipe 8 is positioned eccentrically with respect to the valve disc 11, and the valve disc 11 is secured at its center thru the ball joint 12 to the lower end of the valve stem 13, the valve disc 11 tends to be tilted by the flow of liquid thru the inlet pipe 8. Thus one side of the valve disc 11 is pulled away from the valve seat 16 before the other, cracking the valve and breaking the vacuum which tends to maintain it firmly seated. Thereafter the valve disc 11 is unseated, the float 10 rises, and liquid is caused to flow thru the outlet pipe 9, the discharge pipe 6 and the pipe line (not shown). The float 10 continues to rise until the upper end of the stem 14, indicated by the numeral 27, engages the weight 31 on the lower end of the valve stem 30, causing the valve 29 to be seated. This stops the flow of air or other gas from the casing 7 thru the vent pipe 19. In the meantime a portion of the air or other gas will have been exhausted from the casing 7 by the rising level of liquid in the casing 7. A considerable volume of air or other gas will remain in the upper portion of the casing 7 after the valve 29 is seated, however, and the liquid level within the casing 7 will be determined by the degree to which this volume of air is compressed by action of the static head of liquid within the tank 1. It has been observed, by use of level gauges, that the float 10 ordinarily will not at any time be more than slightly immersed in the liquid flowing thru the casing 7. Thus the liquid in the casing 7 does not tend to be exhausted thru the vent pipe 19.

The valve 29 normally remains seated while liquid is flowing thru the casing 7, thus preventing the passage of air or other gas to or from the casing 7 thru the vent pipe 19. On the other hand, air or other gas may enter the casing 7 from the pipe line (not shown), thru the outlet pipe 9. This will increase the volume of air in the upper portion of the casing 7 and the liquid level will be forced downwardly and the float 10 will be caused to fall, thus unseating the valve 29. This permits air or other gas to be evacuated from the pipe line (not shown), which is desirable. Air or other gas will be exhausted from the casing 7 thru the vent pipe 19 until the pressure of the compressed air or other gas in the upper portion of the casing 7 is again balanced against the pressure created by the static head of liquid in the tank 1.

As the liquid level in the tank 1 approaches the draw-off connection 2, due to withdrawal of liquid therefrom, the flow of liquid thru the header 3, the riser 4 and the inlet pipe 8 tends to proceed at a reduced rate, due to a decrease in pressure resulting from a reduction of the static head of liquid in the tank 1. Such decrease in pressure also permits the volume of compressed air or other gas in the upper portion of the casing 7 to expand, with a consequent reduction of the liquid level in the casing 7. As the liquid level in the casing 7 decreases the float 10 falls and the valve 29 is unseated, permitting air to enter the casing 7 thru the vent pipe 19. The liquid level in the casing 7 is then equalized with the liquid level in the tank 1, and finally, as the liquid level continues to drop, the vacuum created by the flow of liquid thru the pipe line (not shown), the discharge line 6 and the outlet pipe 9, acting upon the valve disc 11, causes it to be seated on the valve seat 16. Thus the valve disc 11 is seated quickly and no air or other gas is permitted to enter the casing 7 from the tank 1. Likewise the valve disc 11 is seated without permitting air or other gas to enter the pipe line (not shown) thru the outlet pipe 9.

The stopcock 20 is provided for emergency use only and normally remains in open position.

The invention may be modified in various ways without departing from the spirit and scope thereof.

I claim:

An automatic shutoff device for liquid conducting lines comprising a vertically disposed cylindrical casing, an inlet pipe and an outlet pipe connected to the bottom of the casing and extending upwardly a short distance therefrom, a valve seat in the outlet pipe, a cylindrical float received bodily within the casing, a valve stem connected at its upper end to the float, a valve disc connected at its center thru a ball joint to the lower end of the valve stem, the valve disc being of relatively large diameter and adapted to cover the ends of both the inlet pipe and the outlet pipe, the inlet pipe being disposed eccentrically with respect to the valve disc, a vent pipe extending thru the top of the casing, a valve housing connected to the vent pipe, a valve seat and a valve in the valve housing, and a valve stem connected at its upper end to the valve, the valve stem being actuated by the float when it is in its uppermost position to cause the valve to be seated.

TOM E. PARRISH.

REFERENCES CITED

The following references are of record in the file of this patent:

UNITED STATES PATENTS

| Number | Name | Date |
|---|---|---|
| 1,588,712 | Duck | June 15, 1926 |
| 1,689,477 | Capers | Oct. 30, 1929 |
| 2,210,751 | Cronnhite | Aug. 9, 1940 |
| 2,292,509 | Carson | Aug. 11, 1942 |

FOREIGN PATENTS

| Number | Country | Date |
|---|---|---|
| 469,293 | Germany | of 1928 |